United States Patent
Loehden et al.

(10) Patent No.: US 6,989,409 B2
(45) Date of Patent: Jan. 24, 2006

(54) METHOD FOR SYNTHESIS OF SPRAY-DRIED POLY(METH)ACRYLATE POLYMERS, USE OF SAME AS POLYMER COMPONENTS FOR PLASTISOLS, AND PLASTISOLS PRODUCED THEREWITH

(75) Inventors: Gerd Loehden, Hanau (DE); Sebastian Roos, Kelkheim (DE); Winfried Belzner, Gruendau (DE); Hans-Juergen Geyer, Muehltal (DE); Herbert Jung, Karlstein (DE); Ursula Rausch, Griesheim (DE)

(73) Assignee: Roehm GmbH & Co. KG, Darmstadt (DE)

( * ) Notice: Subject to any disclaimer, the term of this patent is extended or adjusted under 35 U.S.C. 154(b) by 296 days.

(21) Appl. No.: 10/600,832

(22) Filed: Jun. 23, 2003

(65) Prior Publication Data

US 2004/0059023 A1   Mar. 25, 2004

(30) Foreign Application Priority Data

Jun. 21, 2002  (DE) ............................... 102 27 898

(51) Int. Cl.
| | |
|---|---|
| C08L 83/00 | (2006.01) |
| C08L 3/00 | (2006.01) |
| C08K 5/10 | (2006.01) |
| C08J 3/02 | (2006.01) |
| C08J 3/00 | (2006.01) |

(52) U.S. Cl. ...................... 523/201; 524/309; 524/501; 524/523

(58) Field of Classification Search ................. 523/201; 524/501, 523, 309
See application file for complete search history.

(56) References Cited

U.S. PATENT DOCUMENTS

| | | | |
|---|---|---|---|
| 5,308,890 A * | 5/1994 | Snyder ........................ 523/201 |
| 5,453,458 A * | 9/1995 | Takeuchi et al. ............. 523/201 |
| 6,239,215 B1 * | 5/2001 | Morita et al. .................. 525/65 |
| 6,875,808 B2 * | 4/2005 | Weier et al. .................. 524/504 |
| 2001/0044491 A1 * | 11/2001 | Elser et al. ................... 524/535 |
| 2004/0053065 A1 * | 3/2004 | Saiki et al. ................... 428/500 |

FOREIGN PATENT DOCUMENTS

| | | |
|---|---|---|
| DE | 34498 | 1/1886 |
| DE | 25 43 542 | 10/1986 |
| DE | 198 14 264 | 7/1999 |
| EP | 0 533 026 | 3/1993 |
| EP | 0 774 483 | 5/1997 |
| EP | 1 162 217 | 12/2001 |
| EP | 1 283 228 | 2/2003 |
| FR | 2 291 248 | 6/1976 |
| JP | 07-233299 | * 5/1995 |
| JP | 8-295850 | 11/1996 |
| JP | 11-76855 | 3/1999 |
| WO | WO 01/21707 | 3/2001 |

OTHER PUBLICATIONS

R. Brathun, et al., Literatur S. 1128, Plastics Manual, New Edition, vol. 2/2, pp. 1077-1129, "Pastenverarbeitung Und Pulverbeschichtung", 1986.

H. F. Mark, et al., Encyclopedia of Polymer Science and Engineering, Supplemental volume, pp. 568-647, "PLASTICIZERS", 1989.

* cited by examiner

Primary Examiner—David W. Wu
Assistant Examiner—Mei Q. Huang
(74) Attorney, Agent, or Firm—Oblon, Spivak, McClelland, Maier & Neustadt, P.C.

(57) ABSTRACT

A plastisol formulation which can be used for coatings of metal sheets, the coatings having high abrasion resistance, contains a) a plasticizer or mixture of plasticizers; and b) a mixture of polymer particles containing at least two components A and B; c) at least one member selected from the group consisting of fillers, coupling agents, stabilizers, desiccants, rheological additives, hollow bodies and mixtures thereof; wherein the polymer particles containing at least two components A and B have one of the following structures ba) a 2-stage structure, a 3-stage structure or multi-stage structure, or bb) a gradient polymer structure.

10 Claims, No Drawings

METHOD FOR SYNTHESIS OF SPRAY-DRIED POLY(METH)ACRYLATE POLYMERS, USE OF SAME AS POLYMER COMPONENTS FOR PLASTISOLS, AND PLASTISOLS PRODUCED THEREWITH

BACKGROUND OF THE INVENTION

1. Field of the Invention

The present invention relates to poly(meth)acrylate polymers, to the plastisols obtainable therefrom and metal sheets coated with the plastisols.

2. Discussion of the Background

Coatings and coverings of polyvinyl chloride (PVC) have occupied a predominant position in the market for many years, by virtue of their suitability for diverse applications and of their good properties during use. Dispersions of PVC powders in plasticizers, otherwise known as plastisols, usually supplemented with stabilizers and possibly with fillers/pigments, are being used on a relatively wide scale for coating, especially in hot-dip processes, for purposes such as corrosion protection of metals and finishing of textiles and leathers, for foamed materials, adhesives, etc. (Savetnik, Plastisols and Organisols, Van Nostrand, New York 1972; W. Becker and D. Braun, Kunststoff-Handbuch [Plastics Manual] (new edition), Vol. 2/2, pp. 1077 et seq., Hanser Verlag 1986).

Plastisols are usually two-phase systems, in which one component is a plastic or mixture of plastics (binder) and the second component is a suitable plasticizer. In principle, binders of the most diverse plastics are conceivable, but only very few plastics have found industrial use. By far the most important class of polymers used for this purpose is derived from polyvinyl chloride (PVC). Because of environmental considerations, however, the use of PVC is questionable. Furthermore, the danger of dioxin formation in a fire situation and of the associated contamination of the surroundings is often prohibitive for the use of PVC.

For this reason, attempts have been made to produce plastisols on the basis of polyacrylates (see German Patent 034498, French Patent A 2291248 and European Patent 0774483 A2).

European Patent 0533026 (Röhm GmbH) describes a plastisol system with an improved adhesion to cataphoretic metal sheets, the system being based on polyalkyl(meth)acrylates and the gellable compound being composed of monomers with an alkyl substituent containing 2 to 12 carbon atoms and of an acid anhydride. No information is disclosed on the abrasion resistance of the obtained plastisol formulations.

German Patent 19814264 (Degussa-Hüls AG) describes improved poly(meth)acrylate plastisols having better storage stability, greater elongation at break and better film-forming properties. No information is disclosed on the abrasion resistance of the obtained plastisols.

European Patent 1162217 (Mitsubishi Rayon Co.) describes a poly(alkyl)methacrylate plastisol composed of primary particles with a diameter greater than 250 mm, the primary particles having a core-shell structure. The obtained plastisols are stable during storage, but information on abrasion resistance is not disclosed.

International Patent 01/21707 (Mitsubishi Rayon Co.) describes finely divided polymers for plastisol production. The polymer particles are characterized by a specific surface of between 0.6 and 20.0 $m^2/g$, determined by nitrogen adsorption. Mechanical data of the obtained plastisols are not disclosed.

Japanese Patent 8295850 (Mitsubishi Rayon Co.) describes a poly(meth)acrylate plastisol with gradient-like structure, wherein the concentration of the unsaturated carboxylic acid and the concentration of the monomer, which is not compatible with the plasticizer, increase from the core to the shell. Mechanical data of the plastisol are not disclosed.

Japanese Patent 11-076855 (Mitsubishi Rayon Co.) describes a core-shell polymer containing functional groups. The functional groups of the core-shell polymer are capable of reacting, at gelling temperature (about 200° C.), with further functional groups of an organic low molecular compound. Mechanical characteristics of the plastisol film are not disclosed.

SUMMARY OF THE INVENTION

It is an object of the present invention to provide a polymer or mixture of polymers (binder) that is suitable for plastisol applications and that exhibits improved mechanical characteristics in the plastisol, such as improved abrasion resistance and improved adhesion to a primed metal sheet.

This and other objects have been achieved by the present invention the first embodiment of which includes a plastisol formulation, comprising:

a) a plasticizer or mixture of plasticizers; and b) a mixture of polymer particles comprising at least two components A and B;

c) at least one member selected from the group consisting of fillers, coupling agents, stabilizers, desiccants, rheological additives, hollow bodies and mixtures thereof;

wherein said polymer particles comprising at least two components A and B have one of the following structures ba) a 2-stage structure, a 3-stage structure or multi-stage structure, or bb) a gradient polymer structure.

DETAILED DESCRIPTION OF THE INVENTION

In one embodiment, the present invention provides a polymer mixture comprising polymers A and B. Polymers A and B can have a core-(shell 1)-(shell 2) structure, or a core-(shell 1)-(shell 2)-(shell 3) structure, or a gradient-like structure of the particles. By gradient-like structure of the particles it is understood that, starting from a certain concentration of a monomer in the monomer mixture used for polymerization of the core, the concentration of the monomer in the monomer mixture varies with the radius of the particle, which can be regarded as approximately spherical.

The concentration variation can comprise an increase in concentration or a decrease in concentration of the monomer in question.

In the case of a three-stage emulsion polymer, the polymer particle comprises a core, a first shell and a second shell.

In a preferred embodiment, polymer A has a core (KA), an outermost shell ($S_1A$), a second shell ($S_2A$) and a third shell ($S_3A$).

Preferably, the core of polymer A (K A) comprises a polymer with the following monomer composition:

K A a) 10 to 50 percent by mass, relative to the core material, of (meth)acrylates derived from saturated esters of (meth)acrylic acid Formula I

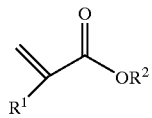

wherein $R^1$=H or $CH_3$, and $R^2$=$CH_3$ or $CH_2CH_3$;

K A b) 50 to 90 percent by mass, relative to the core material, of compounds of formula I, wherein $R^1$ has the meanings indicated hereinabove and $R^2$ can have the following meanings: propyl, isopropyl, tert-butyl, n-butyl, isobutyl, pentyl, hexyl, iso-octyl, octyl, cyclohexyl, 2-ethylhexyl, octadecyl, dodecyl, tetradecyl, oleyl, decyl, benzyl, cetyl, isobornyl, neopentyl, cyclopentyl, undecyl, docosyl;

K A c) 0 to 10 percent by mass, relative to the core material, of vinylaromatic compounds, such as styrene, which can be copolymerized with the monomers cited hereinabove; other compounds copolymerizable with the alkyl(meth)acrylates are, for example, 1-alkenes such as 1-hexene and 1-heptene; branched alkenes such as vinylcyclohexene, 3,3-dimethyl-1-propene, 3-methyl-1-diisobutylene, 4-methyl-1-pentene; vinyl esters such as vinyl acetate; styrenes with an alkyl substituent in the side chain, such as α-methylstyrene and α:-ethylstyrene, substituted styrenes with an alkyl substituent on the ring, such as vinyltoluene and p-methylstyrene, halogenated styrenes such as monochlorostyrenes, dichlorostyrenes, tribromostyrenes and tetrabromostyrenes; and K A d) 0.1 to 9.9 percent by mass of monomers containing an epoxy group, examples being glycidyl methacrylate or glycidyl acrylate.

The amount of monomer KA a) includes all values and subvalues therebetween, especially including 15, 20, 25, 30, 35, 40 and 45% by mass. The amount of monomer KA b) includes all values and subvalues therebetween, especially including 55, 60, 65, 70, 75, 80 and 85% by mass. The amount of monomer KA c) includes all values and subvalues therebetween, especially including 2, 4, 6 and 8% by mass. The amount of monomer KA d) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by mass.

The outermost shell $S_1$ of polymer A ($S_1$ A) comprises a polymer with the following monomer composition:

$S_1$ A a) 70 to 100 percent by mass of monomers of formula I, wherein:

$R^1$ has the meanings indicated hereinabove, and $R^2$=$CH_3$ or $CH_2CH_3$;

$S_1$ A b) 0 to 30 percent by mass of the monomer of formula I, wherein: the groups have the meaning indicated for K A b);

$S_1$ A c) 0 to 10 percent by mass of a monomer that can be copolymerized with $S_1$ A a) to $S_1$ A b), examples being styrene and styrene derivatives and vinyl acetate. Further preferred monomers are listed under K A c).

The outermost shell of polymer A is preferably free of epoxy-containing monomers.

The amount of monomer $S_1$ A a) includes all values and subvalues therebetween, especially including 75, 80, 85, 90 and 95% by mass. The amount of monomer $S_1$ A b) includes all values and subvalues therebetween, especially including 5, 10, 15, 20, and 25% by mass. The amount of monomer $S_1$ A c) includes all values and subvalues therebetween, especially including 2, 4, 6 and 8% by mass.

The second shell $S_2$ of polymer A ($S_2$ A) comprises a polymer of the following monomer composition:

$S_2$ A a) 20 to 80 percent by mass of monomers of formula I, wherein:

$R^1$ has the meanings indicated hereinabove, and $R^2$=$CH_3$ or $CH_2CH_3$;

$S_2$ A b) 20 to 70 percent by mass of the monomer of formula I, wherein:

$R^1$ has the meanings indicated hereinabove and $R^2$ has the same meanings as for K A b);

$S_2$ A c) 0.1 to 9.9 percent by mass of monomers that contain an epoxy group, examples being glycidyl methacrylate or glycidyl acrylate.

The amount of monomer $S_2$ A a) includes all values and subvalues therebetween, especially including 25, 30, 35, 40, 45, 50, 55, 60, 65, 70 and 75% by mass. The amount of monomer $S_2$ A b) includes all values and subvalues therebetween, especially including 25, 30, 35, 40, 45, 50, 55, 60, 65% by mass. The amount of monomer $S_2$ A c) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by mass.

The third shell $S_3$ of polymer A ($S_3$ A) comprises a polymer of the following monomer composition:

$S_3$ A a) 30 to 100 percent by mass of monomers of formula I, wherein:

$R^1$ has the meanings indicated hereinabove, and $R^2$=$CH_3$ or $CH_2CH_3$;

$S_3$ A b) 0 to 70 percent by mass of the monomer of formula I, wherein:

$R^1$ has the meanings indicated hereinabove and $R^2$ has the same meanings as for K A b);

$S_3$ A c) 0 to 10 percent by mass of a monomer that can be copolymerized with $S_1$ a) to $S_1$ b), the monomers having the meanings indicated for K A c.

The amount of monomer $S_3$ A a) includes all values and subvalues therebetween, especially including 35, 40, 45, 50, 55, 60, 65, 70, 75, 80, 85, 90 and 95% by mass. The amount of monomer $S_3$ A b) includes all values and subvalues therebetween, especially including 5, 10, 15, 20, 25, 30, 35, 40, 45, 50, 55, 60 and 65% by mass. The amount of monomer $S_3$ A c) includes all values and subvalues therebetween, especially including 2, 4, 6 and 8% by mass.

Polymer B comprises a core-shell, a core-(shell 1)-(shell 2) or a core-(shell 1)-(shell 2)-(shell 3) polymer or a polymer of homogeneous structure or a gradient polymer. The different components of polymer B can be a core (KB), an outermost shell ($S_1$B), a second shell ($S_2$B), and a third shell ($S_3$B).

Preferably polymer B comprises

K B a) 10 to 50 percent by mass, relative to the core material, of (meth)acrylates derived from saturated esters of (meth)acrylic acid Formula I

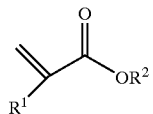
(I)

wherein
$R^1$=H or $CH_3$,
$R^2$=$CH_3$ or $CH_2CH_3$;

K B b) 50 to 90 percent by mass, relative to the core material, of compounds of formula I, where $R^1$ and $R^2$ have the meanings indicated for K A b);

K B c) 0 to 10 percent by mass, relative to the core material, of compounds that can be copolymerized with the monomers cited hereinabove, examples being styrene and styrene derivatives and vinyl acetate; further meanings are listed under K A c);

K B d) 0.1 to 9.9 percent by mass of monomers that contain nucleophilic groups, an example being N-vinylimidazole. Monomers from the class of vinylimidazoles, vinyllactams, vinylcarbazoles and vinylpyridines in particular are also worthy of mention. Examples of such monomeric imidazole compounds, which are not to be construed in any way as limitative, are N-vinylimidazole (also known as vinyl-1-imidazole), N-vinyl-methyl-2-imidazole, N-vinyl-ethyl-2-imidazole, N-vinyl-phenyl-2-imidazole, N-vinyl-dimethyl-2,4-imidazole, N-vinyl-benzimidazole, N-vinylimidazoline (also known as vinyl-1-imidazoline), N-vinyl-methyl-2-imidazoline, N-vinyl-phenyl-2-imidazoline and vinyl-2-imidazole.

Preferred monomers derived from the lactams are compounds such as the following:

N-vinylpyrrolidone, N-vinylmethyl-5-pyrrolidone, N-vinylmethyl-3-pyrrolidone, N-vinylethyl-5-pyrrolidone, N-vinyldimethyl-5,5-pyrrolidone, N-vinylphenyl-5-pyrrolidone, N-allylpyrrolidone, N-vinylthiopyrrolidone, N-vinylpiperidone, N-vinyldiethyl-6,6-piperidone, N-vinylcaprolactam, N-vinylmethyl-7-caprolactam, N-vinylethyl-7-caprolactam, N-vinyldimethyl-7,7-caprolactam, N-allyl-caprolactam, N-vinylcapryllactam.

Preferred monomers derived from carbazole are N-vinylcarbazole, N-allylcarbazole, N-butenylcarbazole, N-hexenylcarbazole and N-(methyl-1-ethylene)carbazole.

The amount of monomer KB a) includes all values and subvalues therebetween, especially including 15, 20, 25, 30, 35, 40 and 45% by mass. The amount of monomer KB b) includes all values and subvalues therebetween, especially including 55, 60, 65, 70, 75, 80 and 85% by mass. The amount of monomer KB c) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by weight. The amount of monomer KB d) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by mass.

The outermost shell $S_1$ of polymer B, ($S_1$ B), comprises a polymer with the following monomer composition:
$S_1$ B a) 70 to 100 percent by mass of monomers of formula I, wherein:
$R^1$ has the meanings indicated hereinabove, and
$R^2$=$CH_3$ or $CH_2CH_3$;
$S_1$ B b) 0 to 30 percent by mass of the monomer of formula I, wherein:

$R^1$ and $R^2$ have the meaning indicated for K A b);
$S_1$ B c) 0 to 10 percent by mass of a monomer that can be copolymerized with $S_1$ B a) to $S_1$ B b), examples being styrene and styrene derivatives and vinyl acetate. Further meanings are as for K A c); and
$S_1$ B d) 0.1 to 9.9 percent by mass of monomers that contain nucleophilic groups.

By monomers that contain nucleophilic groups there are understood those listed under K B d).

The amount of monomer $S_1$ B a) includes all values and subvalues therebetween, especially including 75, 80, 85, 90 and 95% by mass. The amount of monomer $S_1$ B b) includes all values and subvalues therebetween, especially including 5, 10, 15, 20 and 25% by mass. The amount of monomer $S_1$ B c) includes all values and subvalues therebetween, especially including 2, 4, 6 and 8% by mass. The amount of monomer $S_1$ B d) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by mass.

The second shell $S_2$ of polymer B, ($S_2$ B), comprises a polymer of the following monomer composition:
$S_2$ B a) 20 to 80 percent by mass of monomers of formula I, wherein:
$R^1$ has the meanings indicated hereinabove, and
$R^2$=$CH_3$ or $CH_2CH_3$;
$S_2$ B b) 20 to 70 percent by mass of the monomer of formula I, wherein:
$R^1$ has the meanings indicated hereinabove and $R^2$ has the same meanings as for K B b); and
$S_2$ B c) 0.1 to 9.9 percent by mass of monomers that are capable of a nucleophilic reaction with the epoxide-containing monomer of polymer A, an example being N-vinylimidazole.

Preferred nucleophilic monomers are those listed under K B d).

The amount of monomer $S_2$B a) includes all values and subvalues therebetween, especially including 25, 30, 35, 40, 45, 50, 55, 60, 65, 70 and 75% by mass. The amount of monomer $S_2$B b) includes all values and subvalues therebetween, especially including 25, 30, 35, 40, 45, 50, 55, 60 and 65% by mass. The amount of monomer $S_2$B c) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by weight.

The third shell $S_3$ of polymer B, ($S_3$ B), comprises a polymer of the following monomer composition:
$S_3$ B a) 30 to 90 percent by mass of monomers of formula I, wherein:
$R^1$ has the meanings indicated hereinabove, and
$R^2$=$CH_3$ or $CH_2CH_3$;
$S_3$ B b) 10 to 70 percent by mass of the monomer of formula I, wherein:
$R^1$ has the meanings indicated hereinabove and $R^2$ has the same meanings as for K B b);
$S_3$ B c) 0 to 10 percent by mass of a monomer that can be copolymerized with $S_1$a) to $S_1$b), the monomers having the meanings indicated for K A c; and
$S_3$ B d) 0.1 to 9.9 percent by mass of monomers that contain nucleophilic groups.

By monomers that contain nucleophilic groups there are understood those listed under K B d.

The amount of monomer $S_3$ B a) includes all values and subvalues therebetween, especially including 35, 40, 45, 50, 55, 60, 65, 70, 75, 80 and 85% by mass. The amount of monomer $S_3$ B b) includes all values and subvalues therebetween, especially including 15, 20, 25, 30, 35, 40, 45, 50, 55, 60 and 65% by mass. The amount of monomer $S_3$ B c)

includes all values and subvalues therebetween, especially including 2, 4, 6, and 8% by mass. The amount of monomer $S_3B$ d) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by weight.

Quantitative Proportions in Polymer A

The core, (KA), of polymer A can amount to between 20 and 90 percent by mass relative to the total mass of polymer A, the outermost shell, ($S_1$ A), can amount to between 10 and 80 percent by mass relative to the total mass of polymer A, the second shell, ($S_2$ A), can amount to between 0 and 70 percent by mass relative to the total mass of polymer A, and the third shell, ($S_3$ A), can also amount to between 0 and 70 percent by mass relative to the total mass of polymer A. The amount of core, (KA), includes all values and subvalues therebetween, especially including 25, 30, 35, 40, 45, 50, 55, 60, 65, 70, 75, 80 and 85% by mass relative to the total mass of polymer A. The amount of the outermost shell, ($S_1$ A), includes all values and subvalues therebetween, especially including 15, 20, 25, 30, 35, 40, 45, 50, 55, 60, 65, 70 and 75% by mass relative to the total mass of polymer A. The amount of the second shell, ($S_2$ A), includes all values and subvalues therebetween, especially including 5, 10, 15, 20, 25, 30, 35, 40, 45, 50, 55, 60 and 65% by mass relative to the total mass of polymer A. The amount of the third shell, ($S_3$ A), includes all values and subvalues therebetween, especially including 5, 10, 15, 20, 25, 30, 35, 40, 45, 50, 55, 60, and 65% by mass relative to the total mass of polymer A.

In the case of a gradient-type structure of polymer A comprising core, (K A), and gradient shell, (SA), the core can amount to between 0 and 90 percent by weight relative to the total mass of polymer A, and the shell of gradient-type structure can amount to between 10 and 100 percent by mass relative to the total mass of polymer A. For the case of the gradient-type structure of polymer A also, it is appropriate for the outer zone of the polymer particles to be free of the epoxide-containing component. The amount of (KA) in the gradient-type polymer A includes all values and subvalues therebetween, especially including 5, 10, 15, 20, 25, 30, 35, 40, 45, 50, 55, 60, 65, 70, 75, 80 and 85% by mass relative to the total mass of polymer A. The amount of gradient shell, (SA), includes all values and subvalues therebetween, especially including 15, 20, 25, 30, 35, 40, 45, 50, 55, 60, 65, 70, 75, 80, 85, 90 and 95% by mass relative to the total mass of polymer A.

Quantitative Proportions in Polymer B

The core, (KB), of polymer B can amount to between 20 and 100 percent by mass relative to the total mass of polymer B. The outermost shell, ($S_1$B), can amount to between 10 and 80 percent by mass relative to the total mass of polymer B. The further shell ($S_2$B) can amount to between 0 and 70 percent by mass relative to the total mass of polymer B, and the third shell can also amount to between 0 and 70 percent by mass relative to the total mass of polymer B. The amount of core, (KB), includes all values and subvalues therebetween, especially including 25, 30, 35, 40, 45, 50, 55, 60, 65, 70, 75, 80, 85, 90 and 95% by mass relative to the mass of polymer B. The amount of outermost shell, ($S_1$ B), includes all values and subvalues therebetween, especially including 15, 20, 25, 30, 35, 40, 45, 50, 55, 60, 65, 70, 75 and 80% by mass relative to the mass of polymer B. The amount of the second shell, ($S_2$ B), includes all values and subvalues therebetween, especially including 5, 10, 15, 20, 25, 30, 35, 40, 45, 50, 55, 60, 65 and 70% by mass relative to the mass of polymer B. The amount of the third shell, ($S_3$ B), includes all values and subvalues therebetween, especially including 5, 10, 15, 20, 25, 30, 35, 40, 45, 50, 55, 60, 65 and 70% by mass relative to the mass of polymer B.

In the case of the gradient-type structure of polymer B, the mass of the core can amount to between 0 and 90 percent by weight relative to the total mass of polymer B, and the shell, (S B), of gradient-type structure can amount to between 10 and 100 percent by weight relative to the total mass of polymer B. The amount of the core in the gradient type polymer B includes all values and subvalues therebetween, especially including 5, 10, 15, 20, 25, 30, 35, 40, 45, 50, 55, 60, 65, 70, 75, 80 and 85% by mass relative to the mass of polymer B. The amount of shell, (SB), includes all values and subvalues therebetween, especially including 5, 10, 15, 25, 30, 35, 40, 45, 50, 55, 60, 65, 70, 75, 80, 85, 90 and 95% by mass relative to the mass of polymer B.

The weight average molecular weights of polymers A and B range between 200,000 and several millions, preferably 200,000 to 3,000,000, more preferably 500,000 to 2,000,000.

The plastisols according to the present contain plasticizers W that are known in themselves in the proportions that are usual for the purpose. Examples include plasticizers that are usual for PMMA plastisols (and also for PVC plastisols), especially phthalic acid esters as well as adipic acid esters and/or sebacic acid esters, chlorinated paraffins, trialkyl phosphates, aliphatic or araliphatic polyesters and other polymeric plasticizers such as urea plasticizers (see H. K. Felger, Plastics Manual Volume 1/1C, Kanser-Verlag, 1985, as well as in H. F. Mark et al., Encyclopedia of Polymer Science and Engineering, Supplemental Volume pp. 568–647, J. Wiley, 1989). A selection of suitable plasticizers can also be found in German Patent C 2543542. Preferably, there are used plasticizers or plasticizer combinations that impart a viscosity increase of less than ten times and especially less than five times the initial value after the prepared plastisols have been stored for 3 weeks at 30° C. Particularly preferred are dioctyl phthalate, diisodecyl phthalate, diethylhexyl phthalate, Di-$C_7$-$C_{11}$-n-alkyl phthalate, tricresyl phosphate, dibenzyltoluene (LIPINOLO® T, a product of Hüls AG), 2,2,4-trimethyl-1,3-pentanediol dibenzoate (Benzoflex® 354, a product of the Velsicol Co.), and benzyl octyl phthalate.

Furthermore, the plastisols normally also contain inorganic fillers that are known in themselves in proportions of up to 700 parts by weight based on the amount of plastisol. The amount of inorganic fillers includes all values and subvalues between 0 and 700 parts by weight, especially including 50, 100, 150, 200, 250, 300, 350, 400, 450, 500, 550, 600 and 650 parts by weight. Preferred examples include calcium carbonate (chalk), titanium dioxide, calcium dioxide, perlite, precipitated and coated chalks as rheologically active additives, and also thixotropic agents if necessary, such as pyrogenic silica. The particle sizes usually fall into the micron range. Depending on application, the plastisols can also contain additives that are known in themselves, such as coupling agents, surfactants, stabilizers, leveling agents and blowing agents, in proportions of 0 to 5 percent by weight. The amount of additive includes all values and subvalues therebetween, especially including 1, 2, 3, and 4% by weight.

The plastisols can contain standard additives of all types. Examples include antistatic agents, antioxidants, mold-release agents, fire retardants, lubricants, dyes, fluidizing agents, fillers, photostabilizers, organic phosphorus compounds such as phosphites or phosphonates, pigments, anti-weathering agents and plasticizers.

The plastisols of the present invention are useful, for example, for coatings of metal articles, such as metal sheets, for coatings of vehicles, and for coatings of the underbody of vehicles. The coated metal surfaces exhibit high abrasion resistance.

Having generally described this invention, a further understanding can be obtained by reference to certain specific examples which are provided herein for purposes of illustration only, and are not intended to be limiting unless otherwise specified.

EXAMPLES

Example of Synthesis of a Core-(Shell 1)-(Shell 2) Polymer of Type A:

231 kg of demineralized water was introduced as the initial charge into an engineering-scale reactor and heated to 83 to 87 degrees Celsius.

A monomer-containing emulsion comprising

| | |
|---|---|
| 52 kg | demineralized water, |
| 1.44 kg | Disponil SUS I C 875 (emulsifier, produced and sold by Henkel KGaA) |
| 35.6 kg | methyl methacrylate (MMA) |
| 44 kg | n-butyl methacrylate |
| 38 kg | isobutyl methacrylate |
| 2.4 kg | glycidyl methacrylate | was prepared in the emulsifying vessel and added to the reactor over a period of about 45 minutes.

The reaction was initiated with 153 g of sodium persulfate and 212 g of sodium bisulfite ($Na_2S_2O_5$). The post-reaction time was about 10 minutes.

Thereafter the following mixture was added over a period of about 45 minutes at the same temperature:

| | |
|---|---|
| 86 kg | demineralized water |
| 2.4 kg | Disponil SUS I C |
| 115.6 kg | MMA |
| 44 kg | n-butyl methacrylate |
| 38 kg | isobutyl methacrylate |
| 2.4 kg | glycidyl methacrylate |

The reaction was initiated with 15.8 g of sodium persulfate and 13.6 g of sodium bisulfite. The post-reaction time was about 10 minutes.

Then the following mixture was added over a period of about 20 minutes:

| | |
|---|---|
| 34 kg | demineralized water |
| 0.9 kg | emulsifier (Disponil SUS I C) |
| 80 kg | MMA |

The reaction was initiated with 11.6 g of sodium persulfate and 10.0 g of sodium bisulfite. The post-reaction time was 30 minutes.

Polymer B was synthesized by a procedure analogous to the foregoing. Instead of the epoxy-containing compound, such as glycidyl methacrylate, there was used N-vinylimidazole, for example, as the nucleophilic compound.

General Procedure for Production of the Plastisol:

Before being processed to the plastisol, the two polymers A and B, either mixed together or separately, are worked into the previously introduced plasticizer and into the other auxiliary materials. The mixing ratio of polymers A and B can range between 100:0 and 20:80 parts by weight. The quantitative proportion of polymer mixture from the total of polymers A and B to the plasticizer can range between 80:20 and 30:70 parts by weight.

The PAMA plastisol pastes have outstanding characteristics. In particular, they have a long shelf life. Furthermore, they can be simply processed, thus forming a homogeneous plastisol film. This plastisol film has excellent stability and abrasion resistance.

Preparation of the Plastisol Formulation

The following constituents were mixed and homogenized by means of a standard apparatus:

| | |
|---|---|
| Polymer (binder, component A and component B) | 350 parts by weight |
| Jayflex DINP (Exxon) | 244 parts by weight |
| (Plasticizer) diisooctyl phthalate, Omya BSH ($CaCO_3$) | 111 parts by weight |
| Blanc fixe micro (Sachtleben) $BaSO_4$ | 111 parts by weight |
| Omyalite 90 (CaO, Omya) | 22 parts by weight |
| Shellsol I (Shell, diluent) | 70 parts by weight |

Description of the Abrasion Test

The test was performed on the basis of the Renault and VW factory standard. A metal sheet coated with the plastisol to be tested was mounted in an abrasive-blasting cabinet (manufacturer: Auer-Strahltechnik, Model ST 700 PS) and blasted at an angle of 30° by means of an Auer SPA 80 abrasive-blasting gun (boron carbide blasting nozzle, 10 mm nozzle diameter; air nozzle, nozzle diameter 4 mm). The blasting pressure ranged between 3 and 4 bar. The distance between the nozzle and metal sheet being tested was 10 cm. GP 14 chilled cast iron grit with a particle size of 1 to 2 mm was used as blasting agent. The time to break through to the sheet metal was determined.

This method as well as methods used by other automobile manufacturers are described by D. Symietz in "Protection against stone impacts and corrosion", in the series: Die Bibliothek der Technik [The Engineering Library], Vol. 171, Verlag Moderne Industrie (1998).

The plastisol was applied onto a KTL metal sheet (a metal sheet coated with a cataphoresis lacquer) and gelled for 15 minutes at 160° C. The coating had a dried film thickness of 1000 μm.

The specimens were evaluated by the abrasion test and by the cross-cut test according to DIN 53151.

TABLE 1

Summary of the polymer examples

| Example | Composition | | |
|---|---|---|---|
| 1 | 2% glycidyl methacrylate in the core | 2-stage | Polymer A |
| 2 | 4% glycidyl methacrylate in the core | 3-stage | Polymer A |
| 3 | 2% glycidyl methacrylate in the core | 3-stage | Polymer A |
| 4 | 2% imidazole in the core | 3-stage | Polymer B |
| 5 | 2% imidazole in the core and shell | 3-stage | Polymer B |
| 6 | 2% imidazole in the shell only | | |
| 7 | Comparison example: European Patent 0533026, Example 2 | | |
| 8 | Comparison example: German Patent 19814264, Product 8 | | |
| 9 | Comparison example: European Patent 1162217 (MRC), Product 6 | | |
| 10 | Comparison example: European Patent 1162217 (MRC), Product 8 | | |

TABLE 1-continued

Summary of the polymer examples

| Example | Composition |
|---|---|
| 11 | Comparison example: Japanese Patent 8295850 (MRC), Product 1 |

TABLE 2

Results of the plastisol examples

| No. | Binder or polymer | Abrasion in sec | Adhesion |
|---|---|---|---|
| 1 | 100% per Example 1 (component A) | 528 | 1/2 |
| 2 | 100% per Example 2 (component A) | 532 | 1/2 |
| 3 | 100% per Example 3 (component A) | 517 | 2/4 |
| 4 | 100% per Example 4 (component B) | 476 | 0/1 |
| 5 | 100% per Example 5 (component B) | 463 | 0/0 |
| 6 | 100% per Example 6 (component B) | 442 | 0/0 |
| 7 | 50% per Ex. 1 and 50% per Ex. 4 | 535 | 0/1 |
| 8 | 30% per Ex. 1 and 70% per Ex. 4 | 498 | 0/0 |
| 9 | 70% per Ex. 1 and 30% per Ex. 4 | 524 | 1/1 |
| 10 | 50% per Ex. 2 and 50% per Ex. 4 | 522 | 0/2 |
| 11 | 30% per Ex. 2 and 70% per Ex. 4 | 524 | 0/0 |
| 12 | 70% per Ex. 2 and 30% per Ex. 4 | 517 | 0/2 |
| 13 | 50% per Ex. 3 and 50% per Ex. 4 -not stable during storage- | 369 | 1/1 |
| 14 | 50% per Ex. 1 and 50% per Ex. 5 | 539 | 0/0 |
|  | 70% per Ex. 1 and 30% per Ex. 5 | 544 | 0/0 |
|  | 30% per Ex. 1 and 70% per Ex. 5 | 512 | 0/0 |
| 15 | Comparison Example 7 | 198 | 0/0 |
| 16 | Comparison Example 8 | 120 | 5/5 |
| 17 | Comparison Example 9 | 413 | 3/3 |
| 18 | Comparison Example 10 | 369 | 3/3 |
| 19 | Comparison Example 11 | 442 | 2/2 |

German patent application 10227898.9, filed Jun. 21, 2002, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A plastisol formulation, comprising:
a) a plasticizer or mixture of plasticizers; and
b) a mixture of polymer particles comprising at least two components A and B;
c) at least one member selected from the group consisting of fillers, coupling agents, stabilizers, desiccants, rheological additives, hollow bodies and mixtures thereof;
wherein said polymer particles comprising at least two components A and B have one a the following structures
 ba) a 2-stage structure, a 3-stage structure or multi-stage structure, or
 bb) a gradient polymer structure;
  wherein said component A comprises a polymer particle obtained by emulsion polymerization, said polymer particle having a core KA, an outermost shell $S_1A$, a second shell $S_2A$ and a third shell $S_3A$;
wherein said component B comprises a polymer particle comprising a core KB, an outermost shell $S_1B$, a second shell $S_2B$ and a third shell $S_3B$;
wherein said core KA comprises the following monomers in copolymerized form:
K A a) 10 to 50 percent by mass, relative to the core, of (meth)acrylates of Formula I

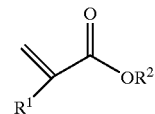

wherein
$R^1$=H or $CH_3$; and
$R^2$=$CH_3$ or $CH_2CH_3$;
K A b) 50 to 90 percent by mass, relative to the core, of compounds of Formula I;
wherein $R^1$=H or $CH_3$, and $R^2$ is selected from the group consisting of propyl, isopropyl, tert-butyl, n-butyl, isobutyl, pentyl, hexyl, iso-octyl, octyl, cyclohexyl, 2-ethylhexyl, octadecyl, dodecyl, tetradecyl, oleyl, decyl, benzyl, cetyl, isobornyl, neopentyl, cyclopentyl, undecyl, and docosyl;
K A c) 0 to 10 percent by mass, relative to the core, of compounds that can be copolymerized with the monomers KA a) and/or KA b); and
K A d) 0.1 to 9.9 percent by mass of monomers containing an epoxy group;
wherein said outermost shell $S_1$ A comprises the following monomers in copolymerized form:
$S_1$ A a) 70 to 100 percent by mass of monomers of Formula I,
wherein
$R^1$=H or $CH_3$, and
$R^2$=$CH_3$ or $CH_2CH_3$;
$S_1$ A b) 0 to 30 percent by mass of the monomer of Formula I, wherein the $R^1$ and $R^2$ have the meaning indicated for K A b); and
$S_1$ A c) 0 to 10 percent by mass of a monomer copolymerized with $S_1$ A a) and $S_1A$ b);
wherein said second shell $S_2$ A comprises of the following monomers in copolymerized form:
$S_2$ A a) 20 to 80 percent by mass of monomers of Formula I, wherein
$R^1$=H or $CH_3$, and
$R^2$=$CH_3$ or $CH_2CH_3$;
$S_2$ A b) 20 to 70 percent by mass of the monomer of Formula I, wherein
$R^1$=H or $CH_3$, and
$R^2$ has the same meanings as for K A b); and
$S_2$ A c) 0.1 to 9.9 percent by mass of monomers containing an epoxy group;
wherein said third shell $S_3$ A comprises the following monomers in copolymerized form;
$S_3$ A a) 30 to 100 percent by mass of monomers of Formula I, wherein:
$R^1$=H or $CH_3$, and
$R^2$=$CH_3$ or $CH_2CH_3$;
$S_3$ A b) 0 to 70 percent by mass of the monomer of Formula I, wherein:
$R^1$=H or $CH_3$, and $R^2$ has the same meanings as for K A b); and
$S_3$ A c) 0 to 10 percent by mass of a monomer that can be copolymerized with $S_1$A) to $S_1$A), the monomers having the meanings indicated for K A c);
wherein said core KB comprises the following monomers in copolymerized form:
K B a) 10 to 50 percent by mass, relative to the core, of (meth)acrylates Formula I Formula I

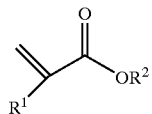

wherein
$R^1$=H or $CH_3$; and
$R^2$=$CH_3$ or $CH_2CH_3$;
K B b) 50 to 90 percent by mass, relative to the core, of compounds of Formula I, wherein $R^1$ and $R^2$ have the meanings indicated for K A b);
K B c) 0 to 10 percent by mass, relative to the core, of compounds copolymerizable with the monomers KB a) and/or KB b); and
K B d) 0.1 to 9.9 percent by mass of monomers that contain nucleophilic groups,
$S_1$ B a) 70 to 100 percent by mass of monomers of Formula I, wherein:
$R^1$=H or $CH_3$, and
$R^2$=$CH_3$ or $CH_2CH_3$;
$S_1$ B b) 0 to 30 percent by mass of the monomer of Formula I, wherein:
$R^1$ and $R^2$ have the meaning indicated for K A b);
$S_1$ B c) 0 to 10 percent by mass of a monomer copolymerizable with $S_1$ B a) and/or $S_1$ B b); and
$S_1$ B d) 0.1 to 9.9 percent by mass of monomers that contain nucleophilic groups;
wherein said second shell $S_2$ B of polymer B comprises the following monomers in copolymerized form:
$S_2$ B a) 20 to 80 percent by mass of monomers of Formula I, wherein:
$R^1$=H or $CH_3$, and
$R^2$=$CH_3$ or $CH_2CH_3$;
$S_2$ B b) 20 to 70 percent by mass of the monomer of Formula I, wherein:
$R^1$=H or $CH_3$, and $R^2$ has the same meanings as for K B b); and
$S_2$ B c) 0.1 to 9.9 percent by mass of monomers that are capable of a nucleophilic reaction with the epoxide-containing monomer of polymer A;
wherein said third shell $S_3$B comprises of the following monomers in copolymerized form:
$S_3$ B a) 30 to 90 percent by mass of monomers of Formula I, wherein:
$R^1$=H or $CH_3$, and
$R^2$=$CH_3$ or $CH_2CH_3$;
$S_3$ B b) 10 to 70 percent by mass of the monomer of Formula I, wherein:
$R^1$=H or $CH_3$, and $R^2$ has the same meanings as for K B b);
$S_3$ B c) 0 to 10 percent by mass of a monomer copolymerizable with $S_1$B a) and/or $S_1$B b), the monomers having the meanings indicated for K A c); and
$S_3$ B d) 0.1 to 9.9 percent by mass of monomers that contain nucleophilic groups.

2. The plastisol formulation according to claim 1, wherein a mixing ratio of components A and B ranges between 80:20 and 20:80 parts by weight.

3. The plastisol formulation according to claim 1, wherein a mixing ratios relative to the total mass of the component A have the following values:
(K A)20 to 90 percent by mass,
($S_1$A)10 to 80 percent by mass,
($S_2$A) 0 to 70 percent by mass, and
($S_3$A) 0 to 70 percent by mass.

4. The plastisol formulation according to claim 1, wherein a mixing ratio relative to the total mass of the component B has the following values:
(K B) 20 to 100 percent by mass,
($S_1$B) 0 to 80 percent by mass,
($S_2$B) 0 to 70 percent by mass, and
($S_3$B) 0 to 70 percent by mass.

5. The plastisol formulation according to claim 1, wherein said component A represents a gradient polymer, wherein the proportions by mass relative to the polymer A are as follows:
(K A) 0 to 90 percent by mass, and
(S A) 10 to 100 percent by mass.

6. The plastisol formulation according to claim 1, wherein said component B represents a gradient type, wherein the proportions by mass relative to the polymer B are as follows:
(K B) 0 to 90 percent by mass,
(S B) 10 to 100 percent by mass.

7. A method for coating of a metal sheet, comprising:
contacting a metal sheet with the plastisol according to claim 1.

8. A metal sheet coated with a plastisol formulation according to claim 1.

9. A vehicle, at least partly coated with a plastisol formulation according to claim 1.

10. A method for underbody protection of vehicles, comprising:
contacting a underbody of a vehicle with the plastisol formulation according to claim 1.

* * * * *

UNITED STATES PATENT AND TRADEMARK OFFICE
CERTIFICATE OF CORRECTION

| | |
|---|---|
| PATENT NO. | : 6,989,409 B2 |
| APPLICATION NO. | : 10/600832 |
| DATED | : January 24, 2006 |
| INVENTOR(S) | : Loehden et al. |

Page 1 of 1

It is certified that error appears in the above-identified patent and that said Letters Patent is hereby corrected as shown below:

Col. 3, line 21, change "isobomyl" to --isobornyl--;

Table at Col. 10, line 20, delete "111 parts by weight"; and

Line 21, after "Omya BSH (CaCO$_3$)" insert --111 parts by weight--.

Signed and Sealed this

First Day of August, 2006

JON W. DUDAS
*Director of the United States Patent and Trademark Office*